Dec. 2, 1941.   R. E. MARBURY ET AL   2,264,994
POLYPHASE CAPACITOR ASSEMBLY
Filed Feb. 23, 1939
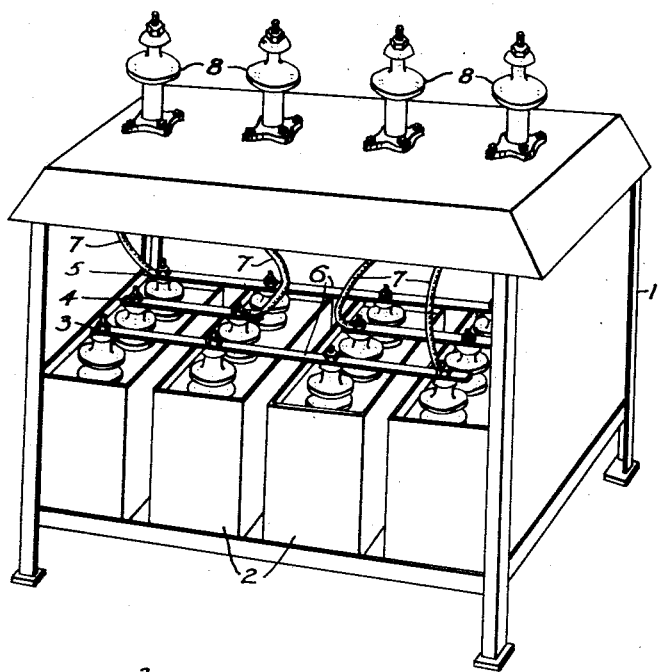
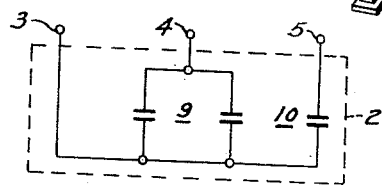
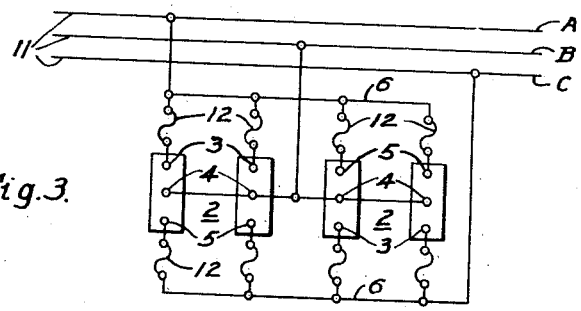
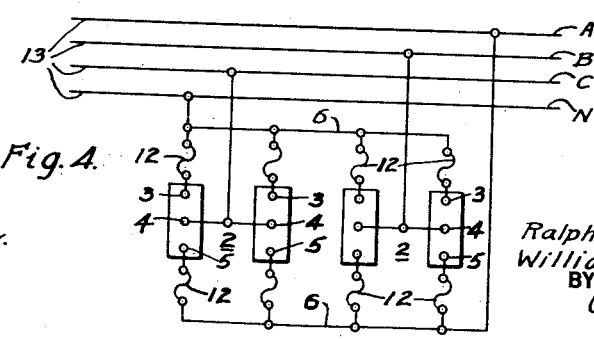
WITNESSES:
N. F. Susan
F. P. Lyle
INVENTORS
Ralph E. Marbury and
William H. Cuttino.
BY
O. B. Buchanan
ATTORNEY Patented Dec. 2, 1941

2,264,994

UNITED STATES PATENT OFFICE 2,264,994

POLYPHASE CAPACITOR ASSEMBLY

Ralph E. Marbury, Wilkinsburg, and William H. Cuttino, Forest Hills, Pa., assignors to Westinghouse Electric & Manufacturing Company, East Pittsburgh, Pa., a corporation of Pennsylvania Application February 23, 1939, Serial No. 257,852

4 Claims. (Cl. 172—246)

The present invention relates to polyphase capacitor assemblies, and more particularly to an improved type of sectionalized capacitor unit for use in such assemblies.

When capacitors are used on three-phase circuits for improving the power factor, or for other purposes, they are usually arranged in banks and connected to the line, and it is necessary to supply equal capacitance to each phase to obtain a balanced condition. This may be done by connecting a sufficient number of single-phase capacitors to each phase of the circuit to obtain the desired capacity. It is desirable, however, to use units of as large capacity as possible, since the cost per kva is less for larger units, and when single-phase units are used, the total number must be a multiple of 3, which sometimes makes it necessary to use units of small size in order to obtain the desired total capacity. Three-phase units are therefore often used to permit the use of units of larger size. These units have three sections of equal capacity which are connected in delta inside the capacitor case and brought out to three terminals on the case for connection to the line. This type of unit has the disadvantage, however, that it can be used only on one voltage, and it is not possible to reconnect the same units in star for use on a circuit of higher voltage.

It has been previously proposed to avoid these disadvantages by providing a sectionalized capacitor unit having two sections of unequal capacitance, so arranged that an even number of such units may be connected to supply equal capacitance to each phase of a three-phase circuit. These units have two sections, one of which has approximately twice the capacitance of the other, and they are so arranged that an even number of units may be readily connected either in delta or star to a three-phase circuit with the sections of larger capacitance of half the units connected to one phase of the circuit, the sections of larger capacitance of the other half of the units connected to a second phase, and all the sections of smaller capacitance connected to the third phase.

The principal object of our present invention is to provide a tapped capacitor-unit, and a three-phase capacitor assembly of the type described above, in which a special terminal-arrangement is provided, whereby the connections between the individual units can be simply and neatly made, and in which the change from delta to star connection can be readily made, and additional tapped single-phase units or delta-connected three-phase units can be readily added to an existing installation, with a minimum of rearrangement of the connections between the units.

Further objects and advantages of the invention will be apparent from the following detailed description taken in connection with the accompanying drawing, in which:

Figure 1 is a perspective view of a capacitor assembly embodying the invention,

Fig. 2 is a diagram showing the internal arrangement of a capacitor unit, and

Figs. 3 and 4 are wiring diagrams showing the connections of the capacitor assembly of the present invention in delta and star, respectively.

As shown in Figure 1, the capacitor assembly of the present invention is preferably supported in a rack or housing 1 of any suitable type, which may be provided with front and rear doors, not shown. The capacitor units 2 are placed side by side in the rack, any desired number of units divisible by two being used to obtain the desired capacity. As shown on the drawing, each unit 2 is a tapped unit, tapped at the two-thirds point, and comprising a generally rectangular case containing the capacitor sections and having three terminals 3, 4 and 5, to which the sections are connected. The individual units 2 are interconnected by means of bus bars 6 of copper or other conducting material, and flexible conductors 7 are provided for connecting the bus bars to bushings 8 on the top of the rack for connection to the line.

The internal arrangement of the individual capacitor units 2 is shown diagrammatically in Fig. 2, from which it will be seen that each unit contains two sections 9 and 10, one of which has twice the capacitance of the other. A common terminal 3 for both sections is provided at one end of the unit, and the section 9 of greater capacitance is connected to the center terminal 4, while the section 10 of smaller capacitance is connected to the terminal 5 at the opposite end. This arrangement, with the section of greater capacitance connected to the center terminal of the unit, is an important feature of the invention, since it makes possible a very simple arrangement of the connecting bus bars, as well as having numerous other advantages which will appear more fully hereinafter.

Fig. 3 shows four capacitor units of this type connected in delta to a three-phase line indicated at 11. It is to be understood that only two units might be used, or that a greater number could be employed to obtain greater capacity, by adding additional units in parallel with those shown, so long as the total number is divisible by two. Half of the units are placed with their common terminals at one side of the assembly, while the other half have their common terminals at the opposite side and the delta connection is then obtained very simply by using 3 straight bus bars 6, each of which joins the terminals in corresponding positions in all the units, without requiring any crossed bus-bar connections. It will be clearly seen from the drawing, that the effect of this is to connect the sections of larger capacitance, between the common terminal 3 and the central terminal 4 of the two units at the left in the figure between conductors A and B, while the sections of larger capacitance, between the oppositely disposed common terminals 3 and the central terminal 4 of the two right-hand units, as shown in Fig. 3, are connected between conductors B and C, and all four sections of small capacitance, between the two end-terminals 3 and 5 of all four units, are connected between conductors A and C. Thus, a very simple arrangement of the three three-phase bus bars 6 is obtained, and additional tapped units of the same style, or additional three-phase units, may be added at any future time, by merely extending each of the three-phase bus bars 6 in a straight line. If desired, individual fuses 12 may be provided for the protection of the capacitor units, and these fuses may conveniently be mounted directly on the terminals in a known manner.

The same units can be readily connected in star to a three-phase, four-wire line 13, as shown in Fig. 4. It will be noted in this figure that the individual units are all placed with their common terminals at the same side of the assembly. The star connection is then obtained by connecting all of the common terminals to the neutral conductor N, while all of the sections of smaller capacitance, the terminals of which are at the opposite ends of the units, are connected to one of the phase conductors, such as A. The center terminals of half the units are connected to conductor B and the center terminals of the other half to conductors C. It will be seen that this connection is also obtained by a very simple arrangement of bus bars, since the outside terminals at each side of the assembly are joined together by single bus bars and the center terminals are connected in two groups, so that no cross connections are required. It is also to be noted that the change from delta to star connection can be very easily accomplished merely by rotating half of the units through 180°, so that all of the common terminals are at the same side, and making a very slight rearrangement of the bus bars.

The arrangement of the sectionalized units with the section of larger capacitance connected to the center terminal has numerous advantages. Thus, it makes possible the simplicity of connections and the ease of changing from delta to star connection described above. It also makes it possible to design the units so that they are interchangeable with standard three-phase units, as pointed out above, and the same racks can be used for both. This has the great advantage that standard three-phase units can be connected in parallel with the sectionalized units, and thus any necessary total number of units can be used to obtain the desired capacity, provided the number of sectionalized units is always divisible by two.

There is no difficulty in thus connecting three-phase units in parallel with the sectionalized units since it is only necessary to extend the bus bars to the terminals of the three-phase unit or units and thus no change in the bus bar arrangement is required. Furthermore, a very neat and simple bus bar arrangement is obtained in either delta or star connection, since no cross connections are necessary and only straight bus bars are used. The ease with which the change from delta to star connection can be made is also an important advantage, since it makes it possible with a minimum of difficulty to use the same units on circuits of different voltage. For example, the same units can be used in delta connection on a 2300 volt line or in star connection on a 4000 volt line having a neutral conductor. These new units can also be used, if desired, as single-phase units merely by connecting the terminals of the two sections with a jumper and the two outside terminals can then be used to connect the unit in the same manner as a standard single-phase unit. This may be desirable or necessary in some cases where a number of units which is divisible by three but not by two must be used to obtain the desired capacity.

It will be apparent, therefore, that a sectionalized capacitor unit has been provided which is so arranged that an even number of units can be used to supply equal capacity to each phase of a three-phase circuit and that because of the internal arrangement of these units, they can be readily connected in a three-phase bank either in star or in delta with a very simple bus bar arrangement to obtain either connection. Although a specific embodiment of the invention has been illustrated and described, it is to be understood that it is not limited to the exact details shown, but that in its broadest aspects it includes all equivalent embodiments and modifications which come within the scope of the appended claims.

We claim as our invention:

1. A three-phase capacitor assembly comprising a plurality of capacitor units, each of at least one pair of said units having two sections one of which has substantially twice the capacitance of the other and each of said sectionalized units having a terminal at one end of the unit for the section of smaller capacitance, a terminal in the center for the section of greater capacitance and a common terminal for both sections at the opposite end, and means for connecting said units to a three-phase circuit to supply substantially equal capacitance to each phase.

2. A three-phase capacitor assembly comprising a plurality of capacitor units, each of at least one pair of said units having two sections one of which has substantially twice the capacitance of the other and each unit having a terminal at one end thereof for the section of smaller capacitance, a terminal in the center for the section of greater capacitance and a common terminal for both sections at the other end, the units being arranged side by side with the common terminals of half of the units at the opposite side of the assembly from those of the other half, a conductor extending between all of the terminals at one side of the assembly, a conductor extending between all of the terminals at the other side of the assembly, a conductor extending between all of the center terminals, and means connecting each of said conductors to one of the conductors of a three-phase circuit.

3. A three-phase capacitor assembly comprising a plurality of capacitor units, each of at least one pair of said units having two sections one of which has substantially twice the capacitance of the other and each unit having a terminal at one end thereof for the section of smaller capacitance, a terminal in the center for the section of greater capacitance and a common terminal for both sections at the other end, the units being arranged side by side with their terminals in corresponding positions, a conductor extending between the common terminals of all the units, means connecting said conductor to the neutral conductor of a three-phase, star-connected circuit, a second conductor extending between all of the terminals at the opposite side of the assembly, means connecting said second conductor to one of the phase conductors of the circuit, means connecting the center terminals of half of the units to another phase conductor, and means connecting the center terminals of the remaining units to the third phase conductor.

4. A capacitor unit comprising a case, a capacitor contained in the case and having two sections, one of said sections having substantially twice the capacitance of the other, a common terminal for both sections mounted on top of the case at one end thereof, a terminal for the section of smaller capacitance mounted on top of the case at the other end thereof, and a terminal for the section of greater capacitance mounted on top of the case in the center.

RALPH E. MARBURY.
WILLIAM H. CUTTINO.